Dec. 9, 1969 E. SIMON 3,482,594
PRESSURE RELIEF VALVE
Filed Jan. 16, 1967
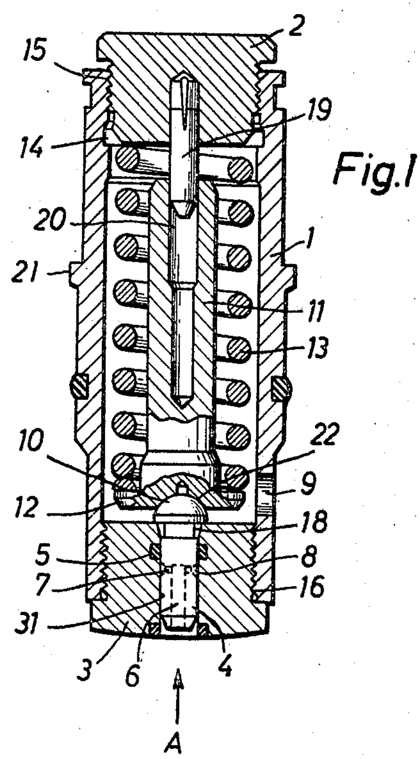
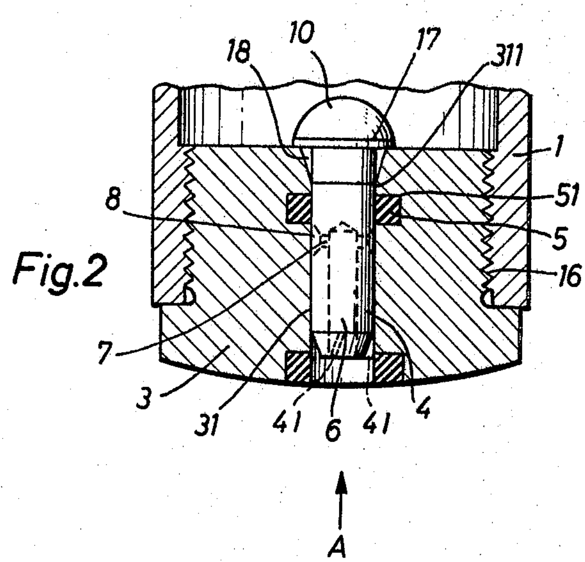
INVENTOR
ERFRIED SIMON
BY
Burgess, Dinklage & Sprung
ATTORNEYS United States Patent Office 3,482,594

Patented Dec. 9, 1969

3,482,594

PRESSURE RELIEF VALVE

Erfried Simon, Lunen-Gahmen, Germany, assignor to Gewerkschaft Eisenhutte Westfalia, Wethmar, near Lunen, Westphalia, Germany Filed Jan. 16, 1967, Ser. No. 609,554
Claims priority, application Germany, Jan. 20, 1966, G 45,771
Int. Cl. F16k *17/04*
U.S. Cl. 137—538 9 Claims

ABSTRACT OF THE DISCLOSURE

Pressure relief valve including a cap with a bore therethrough terminating at its outlet end in an outlet conduit and containing an intermediate peripheral groove carrying an elastomeric peripheral seal, and a piston inserted in the bore slidably against the seal and spring loaded at its corresponding outlet end against the pressure fluid counterforce acting on its pressure end, the piston containing an inlet conduit extending from its pressure end partially therethrough which terminates in transverse sub-conduits having divergent openings facing the bore normally on the pressure side of the seal yet communicating with said outlet conduit upon movement to the outlet side of the seal when excess counterforce causes piston displacement toward said outlet conduit.

The present invention relates to a pressure relief valve which may be utilized, for example, in hydraulic props in underground mine workings, and the like, to compensate for over-pressure exerted on such hydraulic props.

It is well recognized that hydraulic props used in mine workings must be protected against the ocurrence of intolerably great pressure to avoid damage to the props or rupture thereof. Such great internal pressure will occur if the particular prop is shortened in length under the action of rock pressure exerted at the roof being supported thereby. Such hydraulic props are normally designed in the form of a piston cylinder arrangement, such that the piston forms the upper prop portion which engages the roof. Under excessive rock pressure or roof pressure on such piston, very high internal pressures are generated in the accompanying cylinder which must be avoided to prevent damage or rupture thereof. As a consequence of the problem of excessive internal pressures, hydraulic mining props are usually equipped with a pressure relief valve which responds to excess internal pressure by providing a relief opening. Such relief opening actually forms when a predetermined internal pressure is reached, although the relief opening is closed once again automatically when the internal pressure is reduced in the prop below the predetermined or relief opening actuating pressure.

Understandably, very high demands are made with respect to the reliability and robustness or durability of such pressure relief valve used in mine working equipment such as mining props. On the other hand, the relief valves in question should also be designed so as to permit their replacement on the spot by the workmen without particular difficulties and, at the same time, the relief valve should be positioned on the mining prop or other equipment so as to be easily accessible and not protruding substantially to the exterior, i.e., beyond the prop itself. A further consideration is that the relief valves must be able to withstand the unavoidably rough working conditions which occur in mining operations, without their accuracy of response suffering under such conditions.

It is an object of the present invention to overcome the foregoing drawbacks and to provide a simple, durable, inexpensively produced, and reliable pressure relief valve.

It is another object of the present invention to provide a pressure relief valve of the foregoing type in which the valve assembly is constructed in a form which is replaceable by the workmen at the site of mining operations without particular difficulties.

It is still another object of the present invention to provide a pressure relief valve in which such valve is readily accessible yet does not protrude substantially to the exterior beyond the hydraulic apparatus in which the same is used.

It is a still further object of the present invention to provide a pressure relief valve of the foregoing type in which such valve may withstand rough working conditions in mining operations without loss of accuracy in response to over-pressure which is to be relieved.

It is a still further object of the present invention to provide a pressure relief valve of the foregoing type in which a pressure relief valve cartridge is included which is readily replaceable in whole or in part and which contains a valve bore opening and a valve insert occupying such bore opening and normally biased against the force of the hydraulic pressure to be relieved, with the peripheral interface between the valve bore opening and the valve insert being sealed by a peripheral elastomeric seal and with relief communication being provided between an inlet conduit extending partially through the insert to an external point on the pressure side of the seal and an outlet conduit extending at the bore portion on the opposite side of the seal by displacement of the valve insert to bring such external point of the inlet conduit in communication with the outlet conduit at the discharge side of the seal.

Other and further objects of the invention will become apparent from a study of the within specification and accompanying drawings, in which:

FIG. 1 is a schematic longitudinal sectional view of a pressure relief valve in accordance with one embodiment of the present invention in the form of a replaceable cartridge, and FIG. 2 is a schematic enlarged partial view of the main portion of the relief valve of FIG. 1 illustrating more clearly certain constructional details.

It has new been found, in accordance with the present invention, that a pressure relief valve for pressure fluid medium may now be provided which comprises a bore member having a longitudinal bore defined therein providing a peripheral bore surface thereat, an insert member disposed in said bore in peripheral sealing engagement and longitudinally slidable relation therewith, said members being arranged for relative longitudinal displacement with respect to each other, one said member having longitudinal ends and inlet flow conduit means extending inwardly from one such longitudinal end partially longitudinally therethrough to a first longitudinal point correspondingly spaced from the other longitudinal end thereof and terminating at said bore surface in transversely directed sub-conduit means, said one end of said one member and said inlet conduit means being adapted to be placed in pressure communication with a source of pressure fluid medium to be relieved while said other end of said one member is free from such pressure communication, and resilient biasing means having a predetermined force normally urging said one member in a first closing longitudinal direction toward said one end for normally opposing the counterforce of the pressure fluid medium to be relieved and for normally maintaining said members in a predetermined longitudinal relation in dependence upon the pressure fluid medium counterforce, the other said member having outlet flow conduit means defined therein extending from a second longitudinal point normally spaced from said first longitudinal point and said sub-conduit means in a second relieving longitudinal direction opposite said first direction and being arranged for flow communication with said sub-conduit means to permit escape of pressure fluid medium therethrough to relieve thereby the pressure of said source of pressure fluid medium when the fluid medium counterforce exceeds sufficiently the biasing means force to displace said one member in said second direction substantially from said first to said second point.

More particularly, the valve includes a bore member having a longitudinal bore defined therein providing a peripheral bore surface thereat, an insert member disposed in said bore in longitudinally slidable relation therewith, said members being arranged for relative longitudinal displacement with respect to each other, one said member having longitudinal ends and inlet flow conduit means extending inwardly from one such longitudinal end partially longitudinally therethrough to a first longitudinal point correspondingly spaced from the other longitudinal end thereof and terminating at said bore surface in transversely directed sub-conduit means, said one end of said one member and said inlet conduit means being adapted to be placed in pressure communication with a source of pressure fluid medium to be relieved while said other end of said one member is free from such pressure communication, and resilient biasing means having a predetermined force normally urging said one member in a first closing longitudinal direction toward said one end for normally opposing the counterforce of the pressure fluid medium to be relieved and for normally maintaining said members in a predetermined longitudinal relation in dependence upon the pressure fluid medium counterforce, the other said member having outlet flow conduit means defined therein extending from a second longitudinal point normally spaced from said first longitudinal point and said sub-conduit means in a second relieving longitudinal direction opposite said first direction and further having a peripheral groove defined therein at a third longitudinal point normally intermediate said first and second longitudinal points, said groove carrying longitudinally dimensioned peripheral elastomeric seal means extending transversely at said bore surface into peripheral slidingly sealing engagement with said one member thereat, and the other said member being arranged for flow communication with said sub-conduit means to permit escape of pressure fluid medium therethrough to relieve thereby the pressure of said source of pressure fluid medium when the fluid medium counterforce exceeds sufficiently the biasing means force to displace said one member in said second direction substantially from said first to said second point.

Preferably, the sub-conduit means includes a plurality of individual sub-conduits in common flow communication with said inlet flow conduit and transversely terminating in outwardly diverging openings having a maximum longitudinal dimension which is less than the corresponding longitudinal dimension of said seal means.

Advantageously, stop means may be provided in operative association with the one said member to limit the range of relative longitudinal displacement of the two members with respect to each other. Also, adjustment means may be provided in operative association with the biasing means, such as a coil spring or the like, to adjust the predetermined force of such biasing means with respect to said one member. Preferably, the one member is the insert member and the other member is the bore member.

Referring to the drawing, FIG. 1 shows a pressure relief valve in cartridge form which may be attached conveniently to a pressure fluid medium container or other source for which pressure relief is desired. The cartridge includes the cylindrical sleeve 1 closed at the distal end thereof by a plug or cap screw 2, or the like, and closed at the proximate end thereof by the bore cap member or bore cap screw 3. The mounting of cap screws 2 and 3 in sleeve 1 may be effected in any convenient manner although the use of a screw connection at 15 between cap screw 2 and the distal end of sleeve 1 and at 16 between the proximate end of sleeve 1 and cap screw 3 is preferred in order to permit ready replacement of these parts of the cartridge and/or longitudinal adjustment of the distance between the facing ends of cap screws 2 and 3. Cap screws 2 and 3 may be of similar construction with respect to the foregoing features.

Nevertheless, cap screw 3 is provided with a cylindrical guide or bore 31 extending axially therethrough to accommodate the cylindrical insert member or piston 4 axially displaceable therein. A peripheral groove 51 (see FIG. 2) is defined in the surface of bore 31 of screw 3 to accommodate an elastomeric seal constituted by an O-ring 5. The O-ring or peripheral seal 5 has a sufficient longitudinal or axial dimension to insure efficient sealing of the external periphery of piston 4 within bore 31.

Piston 4 has an axial longitudinal passage or inlet conduit 6 in open communication with bore 31 remote from seal 5 and closed off at an axial point below the opposite end of the piston. Nevertheless, the inner end portion of conduit 6 is provided with cross passages or transverse sub-conduits 7 extending to the external periphery of piston 4 thereat. Sub-conduits 7 are distributed around the periphery of piston 4 and possess preferably conically divergent ends or openings 8 which, in the normal positioning of piston 4 within bore 31, are disposed below the seal 5 in screw 3. The cord diameter or axial dimension of the O-ring or seal 5 is conveniently greater than the outer diameter or axial dimension of the divergent ends or openings 8 in piston 4.

Piston 4 is provided at its upper or inner end with a hemispherical head 10 which bears on a thrust body 11 axially displaceably disposed within the interior of sleeve 1. Head 10 is conveniently larger than the main body diameter of piston 4 to provide a shoulder or stop 17 (see FIG. 2) which prevents extreme downward or outward movement of piston 4 with respect to bore 31. The end of thrust body 11 facing head 10 is provided advantageously as a ball and socket joint with head 10. Thrust body 11 has an annular flange 12 at the end thereof facing piston 4 so as to accommodate advantageously a biasing means normally urging piston 4 outwardly of bore 31 in a direction away from the distal end of sleeve 1. Such biasing means is shown as a valve spring 13 in the form of a coil spring surrounding thrust body 11, disposed within sleeve 1 and bearing at one end on flange 12 and at the other end against the inner side or facing end of cap screw 2. Packing 14 may be provided, if desired, so as to insure a fluid type closure at the distal end of sleeve 1.

Because of the preferred use of threaded connections 15 and/or 16, the predetermined force of spring 13 may be adjusted as desired simply by rotating either or both of screws 2 and 3 inwardly or outwardly of sleeve 1 a given distance. It will be realized by the artisan that if desired, the entirety of the interior of sleeve 1 may be threaded so as to achieve a more versatile range of adjustment of the force of spring 13 or to permit simpler production of the threaded portion or portions of sleeve 1 by undertaking in one step the threading of the entirety of the sleeve interior. The overlying outer ends of screws 2 and 3 may, of course, be omitted to permit unhindered displacement thereof medially within sleeve 1 beyond the outer portions of such distal and proximate ends of the sleeve.

As may be noted more particularly in FIG. 2, the cylindrical guide or bore 31 of screw 3 is widened conically, as for example, by way of an inverted frustoconical surface to provide an outlet conduit 18 at the end of screw 3 facing the interior of sleeve 1. Nevertheless, in the interests of preventing leakage and undue wear of the coacting parts, a short cylindrical section 311 is provided axially between the inward end of the conically widened outlet conduit 18 and the groove 51 carrying the O-ring or seal 5 thereat. More particularly, such cylindrical section 311 will serve to secure supportingly the seal 5 in groove 51 during the operation of piston 4.

A thrust guide in the form of a central pin 19 carried in cap screw 2 is provided so as to engage a corresponding axial bore guide 20 in the upper end of thrust body 11. The coaction of pin 19 and axial bore guide 20 maintains proper axial alignment of the upper end of thrust body 11 during displacement of thrust body 11 against the force of spring 13 as piston 4 is displaced within bore 31. Clearly, however, the construction contemplated permits the guidance of thrust body 11 on pin 19 yet the abutment via the concave spherical surface or socket part 22 on the underside of thrust body 11 central to flange 12 which faces head 10 and which coacts with head 10 as the ball part of the ball and socket joint, enables a limited lateral mobility of such parts in relation to one another to take place. This is true even where certain production inaccuracies are entailed in making the parts, whereby jamming or other misfunctioning of the valve is avoided.

It will be realized by the artisan that screw 3 may be provided with an externally threaded lower extension (not shown) to enable it to be screwed onto an apparatus containing a source of pressure fluid medium such as hydraulic oil, water, or the like, for which pressure relief is to be provided. Specifically, the cartridge in question may be mounted in this manner or in a similar manner onto a hydraulic roof support with the underside of piston 4 and the inlet conduit 6 thereof maintained in pressure communication with the fluid medium in question. Accordingly, the cartridge may be mounted on the cylindrical portion of a hydraulic mining prop in which one part is represented by a corresponding cylinder portion and the other part by a corresponding piston portion operatively received within the cylinder portion. Such mining props are well known (see U.S. Patent 3,192,722).

Alternatively, sleeve 1 may be provided with similar external threads at the end thereof adjacent screw 3 to enable sleeve 1 to be mounted on the mining prop or similar source of pressure fluid medium. In any such instance, the mounting of the cartridge onto the apparatus containing the pressure fluid medium source may be readily effected by the use of a spanner wrench engaging the flat surfaces of flange 21 or similar flat surfaces on screw cap 3 between the externally threaded extension (not shown) mentioned above and the start of the internally threaded portion at 16.

In operation, the pressure of the hydraulic fluid medium, for example, water or hydraulic oil, acts in the direction of arrow A upon the lower or outer end face of piston 4 to provide a counterforce to that of the spring 13 acting in the opposite direction. In the normally biased position, piston 4 is held by spring 13 with shoulder or stop 17 engaging the inner face of screw 3 such that the openings 8 are below seal 5. The pressure of the fluid medium communicating via inlet conduit 6 and sub-conduits 7 merely acts statically upon the adjacent cylindrical surface of bore 31 in the range of the divergent openings 8 (see FIG. 2). Due to the presence of seal 5 thereabove and the fact that seal 5 has a slightly smaller internal diameter than that of bore 31 in order to sealingly engage the cylindrical surface of piston 4, the pressure fluid medium at openings 8 merely acts on the underside or pressure side of seal 5 to reinforce the sealing engagement in question. However, when the pressure of the fluid medium reaches a predetermined value which corresponds to the force of valve spring 13, the excess counterforce of the fluid medium causes piston 4 to move inwardly or upwardly within bore 31 until the divergent openings 8 of sub-conduits 7 are above or beyond the O-ring or seal 5 in the direction toward outlet conduit 18. Such displacement of piston 4 in the direction of arrow A establishes a fluid connection or communication between the fluid medium acting on the underside or outer end of piston 4 as well as on the inner end surface of conduit 6, on the one hand, and the inner space or interior of sleeve 1, on the other hand, via the aforesaid longitudinal inlet conduit 6, transverse sub-conduits 7 and outlet conduit 18. In order to dispose of or discharge fluid medium passing via outlet conduit 18 into the interior of sleeve 1, and thus prevent undesired back pressure, sleeve 1 is provided with one or more discharge outlets 9 therethrough which communicate with the exterior of the cartridge. Once the pressure acting in the direction of arrow A is sufficiently relieved by fluid flow through the fluid connection leading to discharge outlet 9, piston 4 returns to its initial position under the force of spring 13, and the valve is thereby closed.

An advantage of the embodiment shown in the drawing is that on closure of the valve after relief of fluid pressure acting in the direction of arrow A, the O-ring or seal 5 which seals piston 4 actually domes or bulges into the cross passages or sub-conduits 7 in the region of the divergent outer ends or openings 8 thereof to insure the sealing of the valve between the pressure and discharge sides thereof. This is true since a certain hydraulic or pressure fluid medium force acts on the seal 5 through the clearance gap inherently present between the cylindrical surfaces of piston 4 and bore 31. The extent of such inward doming or bulging of the O-ring is dependent upon the shear hardness of the elastomeric material ring and upon the pressure acting in the direction of arrow A. However, independently of the magnitude of such pressure, no damage to the seal 5 will occur, even when the O-ring domes or bulges well into the outer ends or divergent openings 8 of the cross passages 7, because such openings 8 form smooth and gentle transitions with respect to the exterior surface of piston 4 rather than sharp right angle edges as would normally be the case. This feature of providing divergent edges and openings 8 will enhance the useful life of the elastomeric seal used.

In contrast thereto, if a peripheral groove were provided on piston 4, for example, similar to the groove 51 of stationary screw 3, the O-ring 5 would swell into such annular groove to so great an extent that, on the one hand, leakage would take place and, on the other hand, the ring would eventually be squeezed away and destroyed in subsequent movements of piston 4.

It will be realized by the artisan that any conventional elastomeric material may be used to seal piston 4 at groove 51 of screw 3 and O-rings of the type in question are conventionally available.

Because of the use of an outlet conduit in the form of a frusto-conical surface 18 at the upper or inner end of bore 31, it will be appreciated that the cross passages or sub-conduits 7 in piston 4 do not substantially become unrestricted when the valve opens, but instead, effect a relatively smoothly increasing degree of pressure relief dependent upon the extent to which the predetermined pressure or force of spring 13 is exceeded. This smooth onset of the pressure reduction or relief in the fluid medium source, for example in a mining prop, is advantageous especially when the excess counter pressure or internal pressure of the fluid medium source exceeds the predetermined spring force only by a small amount because this enables the valve to close again after only a correspondingly small amount of pressure relief. In the case of a pit prop or mining prop set in supporting engagement between the mine roof and mine floor, for example, where local conditions cause only a slight excess over the set pressure of the prop, the threshold change is minimal and accordingly, the valve will open and close again quickly and after only the required correspondingly minimal pressure relief.

It will be realized by the artisan that even if the excess counter pressure of the fluid medium in the direction of arrow A is sufficient to seat the upper end of thrust body 11 against the adjacent screw 2, piston 4 will still not leave the upper or inner end of bore 31 which is provided with outlet conduit 18 thereat. This is due to the selective proportional dimensioning of the normal distance between the upper end of thrust body 11 and the inner end of cap screw 2, on the one hand, and the socket part 22 and inner or upper end of screw 3 in relation to the length of piston 4, on the other hand. Such distances, as aforesaid, may be varied as well as the predetermined biasing force or threshold force of spring 13 for operating the valve by changing the axial disposition of caps 2 and/or 3 within the length of sleeve 1. Nevertheless, sleeve 1 and caps 2 and/or 3 can be integrally formed with a similar adjustment means such as a screw flange on pin 19 being provided to bear against the upper end of spring 13 in a manner similar to flange 12.

It will be further realized by the artisan that piston 4 and bore 31, as well as inlet conduit 6, sub-conduit 7, openings 8 and outlet conduit 18, may be provided in any desired configuration and the same is true of guide 20 and pin 19 and/or caps 2 and 3 in relation to sleeve 1. It is preferred, as aforesaid, to provide a gradual transition in the dimensions of opening 8 and outlet conduit 18 to avoid undue wear and damage to seal 5 during piston operation as well as abrupt release of pressure fluid medium through outlet conduit 18. On the other hand, it is indeed preferred that the interengaging surfaces of piston 4 and bore 31 be so shaped that operation of the valve imparts rotation to the piston. In this way the wear around the piston and its bore will be equalized. The shaping of the surfaces to impart rotation to the piston may constitute the use of precisely right angle cylinder dimensioning of piston 4 and bore 31 together with the inclusion of vanes at the frusto-conically shaped lower or outer end of piston 4 disposed in helical configuration or at an angle to the axis of the system (shown schematically in FIG. 2 at 41). In this way pressure exerted on piston 4 will tend to spin piston 4 slightly.

A similar effect may be produced by flaring the sub-conduits 7 tangentially outwardly, perhaps in the form of a slight spiral, preferably with all such sub-conduits being within the same transverse plane, so that as fluid passes from openings 8 to outlet conduit 18, a rotational thrust on piston 4 will be exerted to cause similar slight spinning.

Of course, as an alternate provision, manual rotation of piston 4 may be carried out periodically by any desired means. For example, the shoulder or stop 17 may be provided with a depression and a simple tool may be inserted through discharge outlet 9 and into such depression to act as a lever for rotating increments of piston 4.

It will be realized, advantageously, that in accordance with the present invention, the valve may be modified so as to operate as a pressure indicator as well as a relief valve. For this purpose, the piston itself or a part coupled therewith may be fashioned such that a portion extends outwardly through a channel or bore in cap 2. In this regard, the guide or pin 19 could be fixed to the adjacent end of thrust body 11 and extend freely through a bore in cap screw 2 which would serve to guide pin 19 and thus thrust body 11 in the desired axial manner. Also by the degree which such guide or pin 19 would extend through cap 2, the corresponding linear distance would represent a measure of the pressure in the direction of arrow A as well as the state of operation of the pressure relief valve. Certainly, as piston 4 would move inwardly, the degree that the upper end of pin 19 would extend through screw 2 would increase thereby to indicate excess pressure and the relief state of the valve. On the other hand, as piston 4 moved in the opposite direction, the new corresponding retracted position of pin 19 would represent the normal closed position of the valve and the fact that no excess pressure existed in the pressure fluid medium container or source with which the pressure relief valve of the invention is associated.

The artisan will further realize that instead of the helical or coil spring shown, the biasing means may be made in various other conventional forms permitting resilient biasing of piston 4 in a direction opposing that of the pressure represented by arrow A. In this regard, coacting plate springs (see U.S. Patent 3,113,762) or Belleville washers in stacked form may be employed.

Therefore, in accordance with the present invention, a pressure relief valve is provided in which a piston in a bore is acted on by the pressure of a hydraulic fluid at one end and by a spring at the other end; in which an elastomeric seal in a groove in the bore seals the piston in the bore; in which the piston has a longitudinal passage communicating with the pressure side of the piston and cross passages communicating the longitudinal passage with the outer surface of the piston, the outer ends of the cross passages being divergent; and in which the arrangement is such that the spring holds the piston in the bore with the cross passages in the piston being located on the pressure side of the bore seal when the pressure is below a predetermined value and such that the piston is moved against the spring force until the cross passages are displaced beyond the seal to permit pressure fluid to escape when the pressure of the fluid source exceeds such predetermined value, whereby to relieve the pressure of such source.

In accordance with the foregoing, a good and reliable sealing occurs at the valve, because the pressure of the fluid acts on the seal through a clearance gap between the external surface of the piston and the internal surface of the bore in which it is guided, so as to deform the seal. Under the action of the fluid pressure, advantageously, the seal also domes or bulges radially inwardly when the cross passages in the piston surface move therepast. Significantly, the divergent edges of the outer ends or openings of the cross passages tend to prevent the seal from being damaged by such edges as would be the case with right angle edges.

In accordance with one specific embodiment of the present invention, therefore, the pressure relief valve comprises a normally axially stationary bore cap member having a cylindrical bore defined axially therethrough providing a cylindrical bore surface thereat, a corresponding cylindrical insert piston member disposed in said bore in axially slidable relation therewith and arranged for axial displacement therein, said piston member having a working end, a free end and an inlet flow conduit extending inwardly from said working end partially axially therethrough to a first axial point correspondingly spaced from said free end and terminating at said cylindrical surface in a plurality of laterally spaced apart transversely outwardly directed individual sub-conduits in common flow communication with said inlet conduit and having peripherally diverging openings, said working end of said piston member and said inlet conduit being adapted to be placed in pressure communication with a source of pressure fluid medium to be relieved while said free end thereof is free from such pressure communication, and resilient biasing means having a predetermined force normally urging said piston member in a first closing axial direction toward said working end of the piston member for normally opposing the counterforce of the pressure fluid medium to be relieved and for normally maintaining said piston member in a predetermined axial relation with respect to said cap member in dependence upon the pressure fluid medium counterforce, said cylindrical bore having at the axial end thereof adjacent said free end of the piston member an outwardly diverging portion defining an outlet flow conduit extending from a second axial point normally spaced from said first axial point and said sub-conduits in a second relieving axial direction opposite said first direction and further having a peripheral annular groove defined therein at a third axial point normally intermediate said first and second axial points, said groove carrying an axially dimensioned peripheral annular elastomeric seal extending transversely at said cylindrical bore surface into circumferential slidingly sealing engagement with said piston member thereat, and said cap member being arranged for flow communication via said outwardly diverging portion of the cylindrical bore with said sub-conduits to permit escape of pressure fluid medium therethrough to relieve thereby the pressure of said source of pressure fluid medium when the fluid medium counterforce exceeds sufficiently the biasing means force to displace said piston member in said said second direction substantially from said first to said second point.

Preferably, the axial dimension of the diverging openings of the sub-conduits should be less than the corresponding axial dimension of the annular seal to prevent undue wear of the seal and to permit the seal to bulge slightly into the diverging openings to attain a smooth guidance of the seal interface between the slidingly adjacent parts thereat. Also, in the same way, preferably the outwardly diverging portion of the cylindrical bore which defines the outlet flow conduit is provided in the form of a hollow frusto-conical surface so as to attain the aforementioned smooth transition in the valve opening so that the extent of axial displacement of the piston member to open the valve for pressure relief will govern the degree of valve opening to a desired extent and will permit just that relief of pressure necessary to overcome the excess counterforce of the fluid medium source, whereupon axial displacement of the piston member in the reverse direction to close the valve may take place immediately and with a minimum of work.

In accordance with a preferred specific embodiment of the invention, as aforesaid, the cap member is mounted in one end of a tubular sleeve with said free end of said piston member extending into the interior of said sleeve, the other end of said sleeve contains a plug mounted therein, said biasing means is in the form of compression spring means extending within such sleeve interior and compression loaded under a predetermined spring force between said plug and said free end of said piston member, and a discharge aperture is defined in said sleeve to permit the exit of pressure fluid medium passing outwardly through said outlet flow conduit. Desirably, in accordance with a further preferred feature, the spring means acts on the free end of the piston member via an intervening thrust body connected to the free end by means of a ball and socket joint. Considering particular constructional details, the ball and socket joint includes a ball part and a socket part, said ball part being in the form of a hemispherical element attached to said free end of said piston member and having a larger diameter than that of said piston member and the largest diameter of said frusto-conical surface to prevent extreme displacement of said piston member in said first direction which would offset the predetermined axial relation of said piston member with respect to said cap member, and said socket part being in the form of a socket element carrying a peripheral flange and disposed at the end of said thrust body facing said free end of said piston member, said spring means being a coil spring seated at one end against the adjacent portion of said peripheral flange and at the other end against said plug.

In connection with further optional details, the thrust body is guided axially displaceably at the end thereof remote from said socket element by a thrust guide extending from said plug inwardly of said coil spring. Also, the end of the thrust body remote from the socket element is spaced a predetermined axial distance from said plug to limit the range of displacement of said thrust body and in turn said piston member in said second direction and to prevent thereby the offsetting of the predetermined axial relation of said piston member with respect to said cap member.

As a particularly versatile feature of the invention above noted, at least one of said cap member and said plug, and preferably both, should be axially adjustably thread mounted in said sleeve to adjust the predetermined force of said spring against said piston member.

As a further optional feature of great practical value, the cylindrical piston member is rotatably mounted within said cylindrical bore to equalize wear around said piston member and said bore, the piston member preferably being provided with rotation imparting means in order to impart the desired rotation to the piston member within the bore during relief valve operation.

Conveniently, the sub-conduits may be radially outwardly directed and disposed in a common transverse plane to achieve reliable and accurate relief operation. Furthermore, the thrust body may contain an axial guide defined in the end thereof remote from the socket element to receive guidably the thrust guide axially displaceably therein.

Naturally, the construction of the insert member and bore member may be such that the bore member is displaced while the insert member is fixed from displacement, so long as the outer periphery of the bore member being displaced is sealed with respect to the surrounding source of pressure fluid medium acting on one operative end thereof, and the bore may extend either entirely through the bore member or only partially therethrough with no detriment to the intended function of the relief valve construction. Where the bore only extends partially through the bore member, whether the bore member or insert member is displaced, the resilient biasing means such as a coil spring or the like may be loaded between the appropriate end of the insert member and the terminating face of the bore within the bore member adjacent thereto. Obviously, other arrangements for mounting resilient biasing means to achieve a preloading under a predetermined specific force of the appropriate member to be displaced may be utilized and the artisan can readily draw upon known constructions for such elements. Their inclusion is distinguished by the instant combination rather than their normal inherent function as a resilient biasing means. In the same way, the outlet conduit need not be in the form of an inverted frusto-conical surface but may take the form of one or more passages extending from a point in the direction of arrow A above the seal and communicating that portion of the bore with the opposing end of the bore member remote from the source of pressure fluid. This specific construction will often be used where the insert member is axially displaced such as in the embodiment shown, as well as where the bore member contains a bore extending only partially therethrough, regardless of which member is displaceable and which is fixed from displacement so that the fluid medium entering through the inlet conduit 6 of the insert member will at a point on the discharge side of the seal be able to communicate with the outlet conduit in the form of one or more passages extending through the body of the bore member. To achieve reliable discharge, an annular groove may be placed in the cylindrical bore surface above the groove containing the seal in a direction remote from the pressure side of the insert member.

In accordance with a still further alternative, such as where the bore member is displaceable and the insert member is stationary, and where the bore extends completely through the bore member, one or more passages serving the function of inlet conduit 6 may be provided in the appropriate end of the bore member which extend inwardly to the first axial point where they communicate with the bore, so that upon axial movement of the bore member, such passage or passages will communicate with a further passage in the insert member serving the function of the outlet conduit of the embodiment shown whereby to flow communicate the over-pressure through the valve to the discharge end. Again, the passage or passages through the bore member which communicate medially with the bore at the first axial point and/or the passage or passages in the insert member which is stationary, may be provided with annular grooves similar to the groove containing the seal to achieve peripheral communication and reliable pressure fluid flow therethrough.

Although specific drawings have not been included to illustrate all of the embodiments described and contemplated, it is obvious to the artisan that once the concept of the present invention is appreciated, the specific constructions invested with the combination features of the present invention will be readily determined and constructed.

Naturally, where various constructional parts have been defined in terms of "means" in the instant specification and/or claims, such means have been illustrated in the accompanying drawing as specific elements, but in accordance with the present invention, such means contemplate any and all elements usable to achieve the combination arrangement of the invention, as the artisan will appreciate, so long as the disposition of the parts in question is maintained, and any and all such constructional elements are contemplated herein just as if prolix enumeration thereof were set forth in detail herein.

It will be appreciated that the instant specification and drawings are set forth by way of illustration and not limitation, and that various modifications and changes may be made without departing from the spirit and scope of the present invention.

What is claimed is:

1. Pressure relief valve for pressure fluid medium which comprises a tubular sleeve, a normally axially stationary bore cap member mounted in one end of said sleeve and a plug mounted in the other end of said sleeve, said cap member having a cylindrical bore defined axially therethrough providing a cylindrical bore surface thereat, a corresponding cylindrical insert piston member disposed in said bore in axially slidable relation therewith and arranged for axial displacement therein, said piston member having a free end extending into the interior of said sleeve and a working end as well as an inlet flow conduit extending inwardly from said working end partially axially therethrough to a first axial point correspondingly spaced from said free end and terminating at said cylindrical surface in a plurality of laterally spaced apart transversely outwardly directed individual sub-conduits in common flow communication with said inlet conduit and having peripherally diverging openings, said working end of said piston member and said inlet conduit being adapted to be placed in pressure communication with a source of pressure fluid medium to be relieved while said free end thereof is free from such pressure communication, a thrust body connected to said free end of said piston member by means of a ball and socket joint including a ball part in the form of a hemispherical element attached to said free end of said piston member and a socket part in the form of a socket element carrying a peripheral flange and disposed at the end of said thrust body facing said free end of said piston member, a compression loaded coil spring extending within said sleeve interior and being seated at one end against the adjacent portion of said peripheral flange and at the other end against said plug and acting on said free end of said piston member under a predetermined compression spring force normally urging said piston member in a first closing axial direction toward said working end of said piston member for normally opposing the counterforce of the pressure fluid medium to be relieved and for normally maintaining said piston member in a predetermined axial relation with respect to said cap member in dependence upon the pressure fluid medium counterforce, said cylindrical bore having at the axial end thereof adjacent said free end of the piston member an outwardly diverging portion in the form of a hollow frusto-conical surface defining an outlet flow conduit extending from a second axial point normally spaced from said first axial point and said sub-conduits in a second relieving axial direction opposite said first direction and further having a peripheral annular groove defined therein at a third axial point normally intermediate said first and second axial points, said groove carrying an axially dimensioned peripheral annular elastomeric seal extending transversely at said cylindrical bore surface into circumferential sliding sealing engagement with said piston member thereat, the axial dimension of said diverging openings of the sub-conduits being less than the corresponding axial dimension of said annular seal and said hemispherical element attached to said free end of said piston member having a larger diameter than that of said piston member and the largest diameter of said frusto-conical surface to prevent extreme displacement of said piston member in said first direction which would offset the predetermined axial relation of said piston member with respect to said cap member, said cap member being arranged for flow communication via said outlet flow conduit with said sub-conduits to permit escape of pressure fluid medium therethrough to relieve thereby the pressure of said source of pressure fluid medium when the fluid medium counterforce exceeds sufficiently said spring force to displace said piston member in said second direction substantially from said first to said second point, and a discharge aperture defined in said sleeve to permit the exit of pressure fluid medium passing outwardly through said outlet flow conduit.

2. Valve according to claim 1 wherein said thrust body is guided axially displaceably at the end thereof remote from said socket element by a thrust guide extending from said plug inwardly of said coil spring.

3. Valve according to claim 2 wherein the end of said thrust body remote from said socket element is spaced a predetermined axial distance from said plug to limit the range of displacement of said thrust body and in turn said piston member in said second direction and to prevent thereby the offsetting of the predetermined axial relation of said piston member with respect to said cap member.

4. Valve according to claim 3 wherein at least one of said cap member and said plug is axially adjustably thread mounted in said sleeve to adjust the predetermined force of said spring against said piston member.

5. Valve according to claim 4 wherein both said cap member and said plug are axially adjustably thread mounted.

6. Valve according to claim 4 wherein said cylindrical piston member is rotatably mounted within said cylindrical bore to equalize wear around said piston member and said bore.

7. Valve according to claim 6 wherein said piston member is provided with rotation imparting means to impart rotation to said piston member within said bore during operation of the relief valve.

8. Valve according to claim 7 wherein said sub-conduits are radially outwardly directed and disposed in a common transverse plane.

9. Valve according to claim 8 wherein said thrust body contains an axial guide channel defined in said end thereof remote from said socket element which guidably receives said thrust guide axially displaceably therein.

References Cited

UNITED STATES PATENTS

| | | | |
|---|---|---|---|
| 2,005,813 | 6/1935 | Thorsen | 137—538 XR |
| 2,928,417 | 3/1960 | Buckner et al. | 137—538 |
| 3,027,913 | 4/1962 | Chatham et al. | 137—538 XR |
| 3,057,374 | 10/1962 | Gondek | 137—538 |
| 3,084,710 | 4/1963 | Gondek | 137—538 XR |

FOREIGN PATENTS

| | | |
|---|---|---|
| 203,307 | 8/1956 | Australia. |
| 226,177 | 3/1963 | Austria. |
| 1,152,242 | 9/1957 | France. |
| 709,847 | 6/1954 | Great Britain. |
| 570,955 | 12/1957 | Italy. |

JOHN PETRAKES, Primary Examiner